May 26, 1970     G. KIPER     3,513,760
CAMERA SHUTTER PARTICULARLY ADAPTED FOR USE AS DIAPHRAGM
Filed Jan. 29, 1965     6 Sheets-Sheet 4

INVENTOR.
GERD KIPER
BY

May 26, 1970     G. KIPER     3,513,760
CAMERA SHUTTER PARTICULARLY ADAPTED FOR USE AS DIAPHRAGM
Filed Jan. 29, 1965     6 Sheets-Sheet 6

INVENTOR.
GERD KIPER

United States Patent Office 3,513,760
Patented May 26, 1970

3,513,760
CAMERA SHUTTER PARTICULARLY ADAPTED FOR USE AS DIAPHRAGM
Gerd Kiper, Unterhaching, Munich, Germany, assignor to Agfa Aktiengesellschaft, Leverkusen, Germany
Filed Jan. 29, 1965, Ser. No. 428,938
Claims priority, application Germany, Jan. 30, 1964, A 45,116; Mar. 19, 1964, A 45,531; June 11, 1964, A 46,287
Int. Cl. G03b 7/08, 9/58; G01j 1/46
U.S. Cl. 95—10                           31 Claims

ABSTRACT OF THE DISCLOSURE

A camera shutter wherein a leading ring opens the blades during movement from cocked toward rest position and wherein a trailing ring closes the blades upon completion of movement of the leading ring. The movement of the leading ring to rest position is controlled by a retard mechanism.

---

The present invention relates to cameras.

More particularly, the present invention relates to camera shutters which are also capable of acting as a diaphragm.

In particular, the present invention relates to that type of shutter where coaxial leading and trailing rotary shutter rings control the blades in such a way that when both of these rings have no relative movement with respect to each other, as when they turn together, the blades will not be displaced so that the shutter will not be opened or closed, while when there is relative movement between the rings then the shutter blades will be moved to open or close the shutter. In particular, the present invention relates to that type of shutter assembly where a retarding means acts on the leading ring to retard the latter constantly during its running down movement from its cocked to its rest position, so that in this way an accurate control of the aperture can be provided. A shutter structure of this general type is disclosed in copending application Ser. No. 400,539, entitled "Camera Shutter Which Also Functions as a Diaphragm," filed on Sept. 30, 1964, now Pat. No. 3,410,188.

One of the objects of the present invention is to provide a structure of the above type which is capable of actuating a flash assembly so as to ignite the flash lamp in proper synchronism with the operation of the shutter.

A further object of the present invention is to provide for a shutter of the above type a construction which is capable of properly synchronizing with the shutter the ignition of a flash lamp which remains ignited for a relatively long time period.

It is furthermore an object of the present invention to provide a structure of the above type capable of being used not only for flash exposures but also for time exposures.

Furthermore, it is an object of the present invention to provide a structure of the above type which can be used for flash or time exposures and which at the same time gives the operator the opportunity of selecting from one of a plurality of aperture sizes.

It is furthermore an object of the present invention to provide a structure of the above type which can properly synchronize an electronic flash assembly, which has only a short period of illumination and a short delay in ignition, with the shutter of the invention.

With these objects in view the invention includes, in a camera, a shutter means which includes coaxial rotary leading and trailing rings turnable together from a rest to a cocked position, the leading ring turning from the cocked toward the rest position in advance of the trailing ring, to open the shutter means, and the trailing ring then following the leading ring, after a given exposure time, so as to close the shutter means. A retarding means coacts with the leading ring for continuously retarding the running down movement thereof from the cocked to the rest position. In accordance with the present invention a means cooperates with the shutter means to render the latter suitable for use with a flash assembly.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a partly sectional and partly schematic elevational view of one possible embodiment of a shutter according to the invention;

FIG. 2 graphically illustrates the operation of the shutter;

FIG. 3 graphically illustrates the operation of the flash assembly with the shutter operation of FIG. 2;

FIG. 4 graphically illustrates another shutter operation;

FIG. 5 graphically illustrates the flash operation provided with the shutter operation of FIG. 4;

Figure 1:
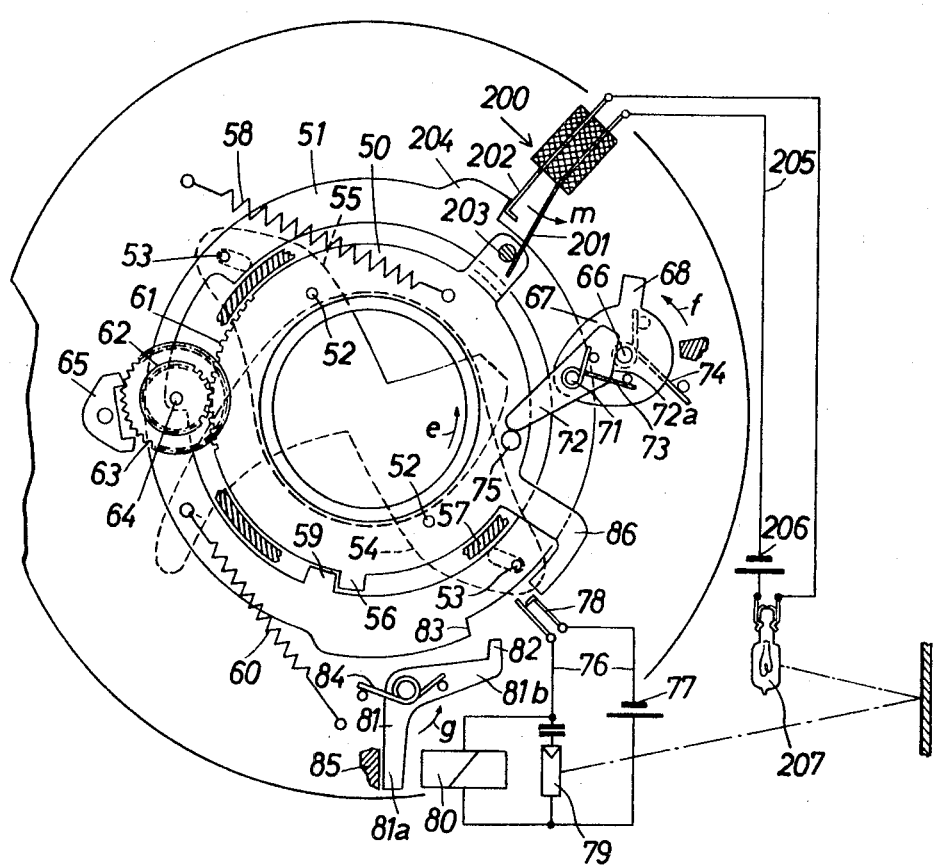

Referring now to FIG. 1, the shutter means illustrated therein includes coaxial rotary leading and trailing shutter rings 50 and 51 respectively carrying pins 52 and 53 for controlling shutter blades 54 and 55. These blades are pivotally connected by the pins 52 to the leading ring 50, and they have a pin-and-slot connection through pins 53 with the trailing ring 51. The leading ring 50 has an outwardly directed stop projection 56 which engages a stationary stop 57 in order to limit the turning of the leading ring 50 by the spring 58, so that in this way the rest position of the ring 50 is determined. The projection 56 engages an inwardly directed projection 59 of the trailing ring 51 which is acted upon by the spring 60 so as to be urged to turn in a direction which displaces the projection 59 toward the projection 56.

The leading ring 50 is provided at a portion of its outer periphery with teeth 61 which mesh with a pinion 62. The pinion 62 is fixed coaxially with an escapement wheel 63, and elements 62 and 63 are supported for rotary movement by a common shaft 64 carried by the stationary supporting structure of the shutter. An anchor 65 is pivotally carried by this supporting structure and coacts with the escapement wheel 63.

In order to cock and release the shutter, a stationary pin 66 supports for rotary movement a cock-and-release lever 67. Of course, instead of a shutter which is automatically released as soon as it is cocked, it is possible to provide a shutter which can be maintained in its cocked position until the operator chooses to release the shutter. The lever 67 is fixed with a fragmentarily illustrated arm 68 capable of being engaged by the operator so that the lever 67 can be manually turned. This lever 67 carries a pin 71 which supports a swing-lever 72 for free rotary movement relative to the lever 67 although the lever 72 is of course carried by the lever 67. A spring 73 is coiled about the pin 71 and engages pins respectively carried by the levers 67 and 72 for urging the lever 72 to turn about the pin 71 in a clcokwise direction, as viewed in FIG. 1, so that in this way part of the lever 72 is urged toward and releasably maintained in engagement with the pin 66. An additional spring 74 is coiled about the pin 66 and engages a stationary pin as well as a pin carried by the lever 67, this spring 74 tending to turn the lever 67 in a direction opposite to that indicated by the arrow $f$ in FIG. 1. A swing-lever 72 engages the pin 75, which is carried by the leading ring 50, so that when the operator turns the lever 67 in the direction of the arrow $f$ in order to cock the shutter in preparation for making an exposure, the lever 67 by engaging the pin 75 will turn the rings 50 and 51 as a unit in a clockwise direction, as viewed in FIG. 1, thus tensioning the springs 58 and 60.

An electrical delay means is provided for controlling the release of the trailing ring 51. This electrical delay means includes the circuit 76 in which there are connected, in series, a current source 77, such as a battery or miniature cell, a control switch 78, and a photosensitive resistor 79. The electrical delay means can also have a different construction such as, for example, those disclosed in the above-mentioned application Ser. No. 400,539. It is preferred to mount the current source 77 in the interior of the camera and the photosensitive resistor 79 at the front side of the camera where the light received by the objective will also be received by the resistor 79. Connected in parallel with the resistor 79 is a relay 80. This relay 80 acts on an arm 81$a$ of a holding pawl 81, this arm 81$a$ thus forming an armature of the relay. The other arm 81$b$ of the holding pawl 81 carries a projection 82 which, in order to prevent running down of the trailing ring 51, engages behind a shoulder 83 formed at the periphery of the ring 51. A spring 84 acts on the lever 81 to urge the latter in a direction oppooiste to that indicated by the arrow $g$ into engagement with a stationary stop 85.

In order to actuate the switch 78, which is a normally open switch, the leading ring 50 is provided with a switch-controlling projection 86 which during cocking movement of the ring 50 engages and closes the switch 78 just prior to the moment when the tip of the lever 72 rides off and moves beyond the pin 75. Of course, this is the moment when the shutter is released to make the exposure. The parts are shown in FIG. 1 where the switch 78 has already closed. However, the pawl 81 has not yet been acted upon by the relay 80 because of the short delay in the energizing thereof.

The shutter includes a switch means 200 for synchronizing the ignition of a flash assembly with the operation of the shutter. This switch means 200 includes a pair of elongated springy contacts 201 and 202. Of course, instead of springy contacts, it is also possible to use movably mounted contacts which are acted upon by suitable springs. The springy contact 201 is capable of being deflected from its rest position by means of a pin 203 carried by the leading ring 50. Thus, during cocking of the ring 50 the member 203 engages the contact 201 so as to deflect the latter in the direction of the arrow $m$. The springy contact 202 is situated in the path of movement of a projection 204 of the trailing ring 51, and during the cocking of the trailing ring the projection 204 thereof will engage and deflect the contact 202 in the same direction as the pin 203 deflects the contact 201.

An electrical circuit 205 of the flash assembly is connected with the switch means 200. This circuit 205 includes a source of current 206 and of course the flash lamp 207, these elements being electrically connected to each other in a well known manner. The flash assembly may either be built into the camera or can be detachably carried thereby.

In order to make an exposure when using the flash assembly, the lever 67 is manually turned in the direction of the arrow $f$. Thus, the lever 72 engages the pin 75 so as to turn the ring 50 in a direction opposite to that indicated by the arrow $e$. The projections 56 and 59 cooperate at this time to cause the ring 51 to turn together with the ring 50. In this way the springs 58 and 60 are tensioned, and toward the end of the cocking movement the elements 203 and 204 engage and deflect the springy contacts 201 and 202 respectively, these contacts of course yielding elastically. These contacts do not engage each other in their rest positions which they automatically assume when they are not acted upon by an outside force, and because of the simultaneous deflection of both of these contacts in the same direction during cocking of the shutter, the contacts 201 and 202 remain out of engagement during cocking of the shutter.

At the end of the cocking movement, the switch-controlling projection 86 of the leading ring 50 engages and closes the switch 78. Therefore, current flows through the circuit 76 and through the relay 80, The relay 80 becomes energized and turns the holding pawl 81 in the direction of the arrow $g$. As a result the projection 82 of the lever 81 becomes situated in the path of movement of the shoulder 83 of the trailing ring 51.

At the end of the cocking of the shutter, the lever 72 moves beyond the pin 75 and thus releases the leading ring 50 for running down movement under the action of the drive spring 58. Of course, it is to be noted that the driving of the leading ring 50 back toward its rest position is also provided in part, during the initial portion of the return of the ring 50, by the force of the deflected springy contact 201. The retarding means 62–65 of course constantly retards the return movement of the leading ring 50. Shortly after the initial part of this return movement the contact 201 which, due to its own resiliency, follows and in fact presses against the pin 203, engages the contact 202. As a result the switch means 200 closes so that the circuit 205 is closed and the flash lamp 207 is ignited. Furthermore, shortly after the initial part of the running down movement of the leading ring 50 the switch-controlling projection 86 has moved away from the switch 78 so that the latter automatically opens. As a result the flow of current in the electrical delay means, which includes the circuit 76, is interrupted. However, the shunt circuit which includes the photosensitive resistor 79, on which light reflected from the object being photographed impinges and derived initially from the lamp 207, delays the deenergizing of the relay 80, because the compensating current returns through the coil of the relay 80 over the shunt circuit. The period of delay depends, therefore, upon the value of the resistor 79, and of course the magnitude of this latter resistance will be determined by the light derived from the lamp 07 and reflected from the subject to the photosensitive resistor 79. In accordance with the intensity of this light and the manner in which the lamp 207 burns out, as well as the distance of the subject from the resistor 79, there will be different delay periods before the relay 80 becomes deenergized.

The deenergizing of the relay 80 releases the pawl 81 to the spring 84 which returns it, in a direction opposite to that indicated by the arrow $g$, to the initial position shown in FIG. 1, where the arm 81$a$ engages the stop 85. As a result, the projection 82 moves away from the shoulder 83 and releases the trailing ring 51 for running down movement. As soon as this trailing ring 51 has been driven by the spring 60, whose force is initially augmented by the force of the deflected contact spring 202 in the direction of the arrow $e$ through a given distance, the projection 204 moves beyond the contact 202 after the latter has reached is rest position, and thus the contact 202, because of its inherent resiliency, becomes spaced from the contact 201 which has already reached its rest position. Therefore, the circuit 205 of the flash assembly is interrupted, so that when a new flash lamp 207 is connected into the circuit there can be no undesired ignition of the flash assembly.

When the operator releases the arm 68, the spring 74 returns the lever 67, in a direction opposite to that indicated by the arrow f, to its initial, starting position. Because of the connection of the lever 72 with the lever 67 by way of the pivot 71 and the spring 73 it is possible for the lever 72 to move past the pin 75 at this time while the lever 72 turns relative to the lever 67 until the lever 72 now moves in the opposite direction beyond the pin 75, whereupon the spring 73 returns the lever 72 to the position illustrated in FIG. 1 with respect to the lever 67.

Figure 2:
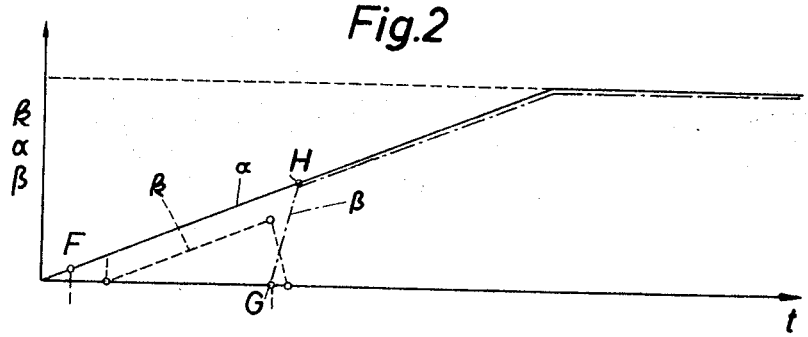
Figure 3:
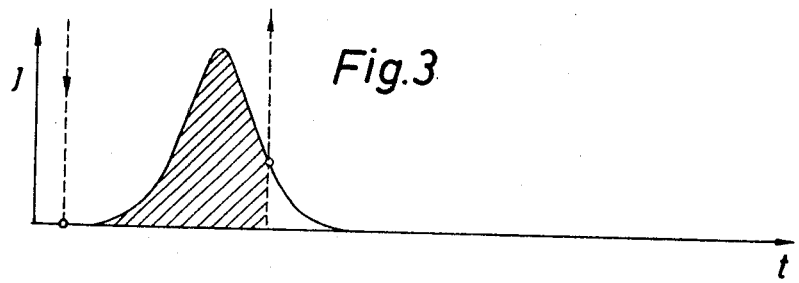
Figure 4:
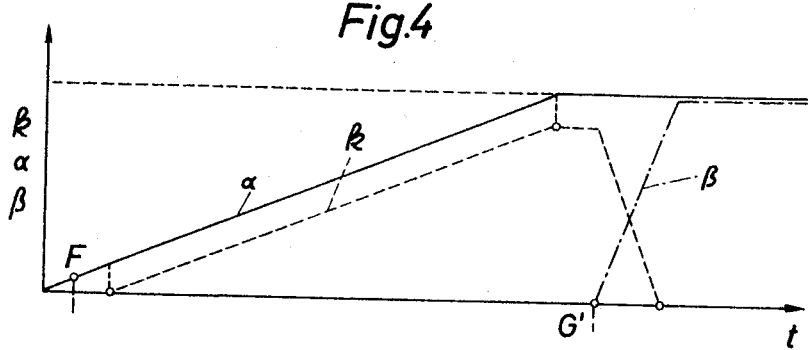
Figure 5:
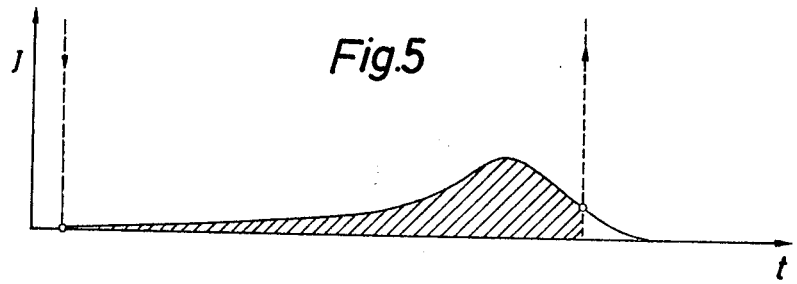

The diagrams of FIGS. 2–5 schematically illustrate the shutter operations for two different types of flash lamps which have different illumination curves, respectively. In all of FIGS. 2–5, the abscissas are graduated according to time. The ordinates of FIGS. 2 and 4 are graduated according to the turning angles $\alpha$ and $\beta$ of the rings 50 and 51 respectively, and there is also included in the ordinates of FIGS. 2 and 4 the size $k$ of the aperture. The ordinates of FIGS. 3 and 5 are graduated according to the light current I.

FIGS. 2 and 3, which go together, illustrate operations which take place when using a flash lamp which has a peak illumination during a relatively short period of time but a high light intensity during this short period of peak illumination, this light of great intensity but short duration being of course reflected back to the photosensitive resistor, as described above. From the diagrams of FIGS. 2 and 3 it is apparent that shortly after the start of the running down of the leading ring 50, this running down movement of ring 50 being indicated by the curve $\alpha$, at the point F, the switch means 200 is closed. As a result the flash lamp is ignited. The light provided by the flash lamp and transmitted to the object to be reflected therefrom to the photosensitive resistor is indicated by the curve in FIG. 3. After a certain amount of light has been given off, as indicated by the shaded area in FIG. 3, so as to change the magnitude of the resistance of the photosensitive resistor 79, the relay becomes deenergized. The ring 51, whose movement is indicated by the dot-dash line curve $\beta$, starts its running down movement, at the point G, in order to initiate the closing of the shutter. At the point H the rings 50 and 51 have resumed their initial angular positions relative to each other, and the shutter is closed. Thus, at the point H both of the rings have returned to that position which they had with respect to each other when the shutter was cocked. From the point H on both of the rings turn together as a unit. As indicated by the dotted line curve $k$ there is provided with this arrangement an average aperture and exposure time, both of which make possible an efficient use of the amount of light given off by the flash lamp.

With the relationships illustrated in FIGS. 4 and 5, there is also, very shortly after the initiation of the running down movement of the leading ring 50, as indicated at point F in FIG. 4, a closing of the switch means 200 so that the flash lamp is ignited. However, in this case the flash is of less intensity but of longer duration than in the case of FIG. 3, so that there is reflected to the photosensitive resistor light as indicated by the shaded area in FIG. 5 which indicates a much flatter illumination and turning curve than in the case of FIG. 3. Therefore, the relay will only become deenergized after a relatively long period of time, as can be appreciated by a comparison of the location of the point G' in FIG. 4 with the location of the point G in FIG. 2, so that in the case of FIGS. 4 and 5 the trailing ring will not even start its running down movement until after the leading ring 50 has returned all the way to its rest position. As indicated by the dotted line curve $k$ in FIG. 4, here is provided in this case a long exposure time and at the same time an opening of maximum size. FIGS. 4 and 5 clearly demonstrate that in this case also the light given off from the flash lamp is used to the greatest possible extent for exposing the film.

Figure 6:
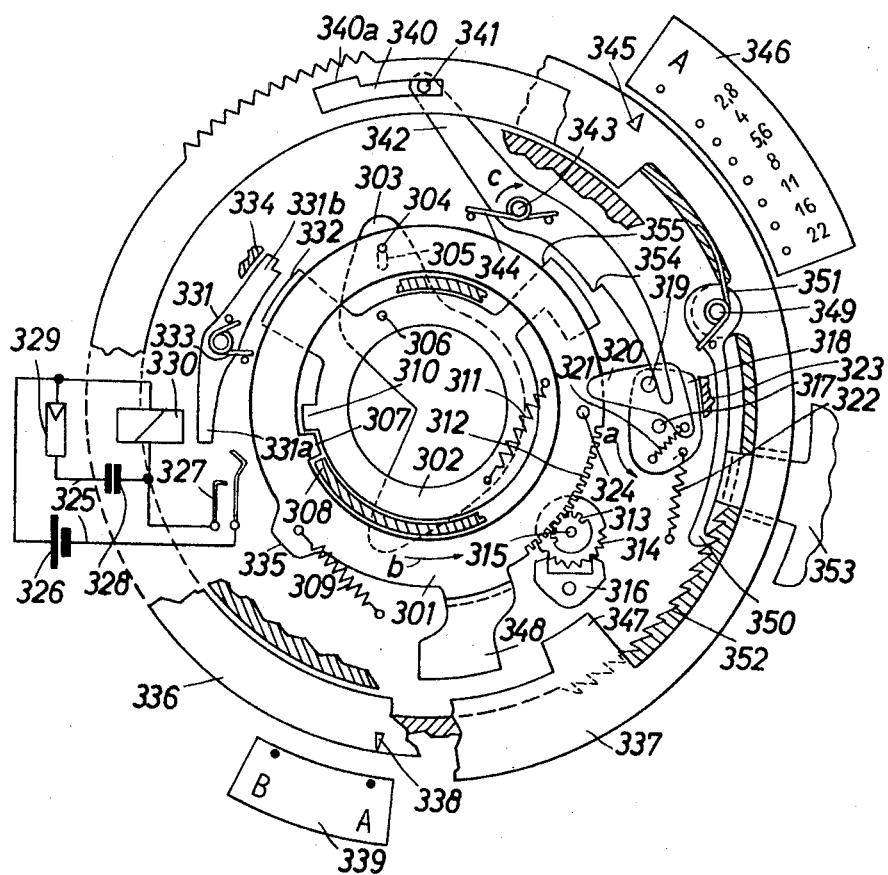
FIG. 6 is a partly sectional and partly schematic elevational view of another embodiment of a shutter assembly according to the invention.

Referring now to FIG. 6, the shutter assembly illustrated therein includes a pair of shutter rings 301 and 302 which are coaxially supported for rotation independently of each other. The ring 301 forms the leading ring which opens the shutter during running down movement of the leading ring 301 in advance of the trailing ring 302. This ring 301 carries a plurality of pins 304 respectively received in slots 305 of a plurality of shutter blades 303, of which only one is shown for the sake of clarity. The ring 302, which is the trailing ring, carries a plurality of pins 306 by which the plurality of shutter blades are respectively pivotally connected with the trailing ring 302 which of course closes the shutter during running down movement of the trailing ring after the leading ring. Thus, the shutter blades 303 are capable of turning relative to each other during turning of the rings 301 and 302 relative to each other.

The leading ring 301 has an inwardly directed projection 307 which cooperates with a stationary stop 308 to limit the turning of the ring 301 by the spring 309 so that in this way the rest or run-down position of the ring 301 is determined. The trailing ring 302 has an outwardly directed projection 310 which is urged by the spring 311 into engagement with the projection 307 which acts as a stop for the ring 302 in order to determine the rest or run-down position thereof.

The ring 301 is provided at a part of its periphery with gear teeth 312 which mesh with a pinion 313. The pinion 313 is coaxially fixed with a escapement wheel 314, and the pinion 313 and the escapement wheel 314 are supported for rotary movement by a shaft 315. An anchor 316 cooperates with the escapement wheel 314.

In order to cock and release the illustarted shutter, a shaft 317 carries a cocking and releasing lever 318. An unillustrated transmission which is assessible to the operator is operatively connected to the shaft 317 to enable the operator to turn this shaft. The lever 318 carries a pivot pin 319 on which a swing-lever 320 is supported for free rotary movement. A spring 321 is connected between the levers 318 and 320, and this spring 321 seeks to maintain the lever 320 in engagement with a projecting portion of the shaft 317. An additional spring 322 is operatively connected with the lever 318 for urging the latter to turn in a direction opposite to that indicaed by the arrow $a$ in FIG. 6, until the lever 318 engages a stationary stop 323. The swing-lever 320, during turning of the lever 318 in the direction of the arrow $a$, engages the pin 324 and turns the ring 301 in a direction opposite to that indicated by the arrow $b$. In this way the shutter is cocked.

In order to control the ring 302 during automatic determination of the exposure, an electrical delay means is provided. This electrical delay means of FIG. 6 includes a circuit 325, shown at the left of FIG. 6, in which there are connected, in series, a source of current 326 such as, for example, a battery or a miniature cell, a control switch 327, a capacitor 328 and a photosensitive resistor 329. Preferably the source of current 326 and the capacitor 328 are situated in the interior of the camera, while the photosensitive resistor 329 is situated at the front side of the camera where it will receive the same light that is received by the objective of the camera.

Connected in parallel with the photosensitive resistor 329 as well as with the capacitor 328 is a relay 330. This relay 330 operates on the arm 331a of a holding pawl 331, this arm 331a being the armature of the relay. The other arm 331b of the holding pawl 331 is capable of moving behind a projection 32 of the trailing ring 302 so as to maintain the latter in its cocked position. A spring 333 is operatively connected with the lever 331 and seeks to turn the arm 331b into engagement with a stationary stop 334.

In order to actuate the switch 327, which is a normally open switch, the leading ring 301 is provided with a control projection 335 which during the cocking movement engages and closes the switch 327 just before the tip of the lever 320 rides off and moves beyond the pin 324.

A manually operable means in the form of a rotary ring 336 is provided to enable the operator to select different types of operation, and in addition a manually operable means in the form of a manually turnable ring 337 is provided for adjusting the structure to provide a selected aperture. Thus, both of these manually operable means respectively take the form of rotary rings which are accessible to the operator. The selecting ring 336 carries an index 338 which cooperates with the scale 339 which is provided with symbols such as the symbol "A" to indicate the position for automatic determination of the extent of exposure of the film and "B" to indicate the position for time exposures where the shutter will be manually maintained opened by the operator for use as long as desired by the operator.

For this latter purpose the ring 336 is formed with a time exposure slot 340 which receives a pin 341 fixed to and projecting from a time exposure lever 342 which is supported for pivotal movement by a stationary pivot pin 343. A spring 344 is operatively connected to the time exposure lever 342 to urge the latter in the direction of the arrow c shown in FIG. 6. The end of the time exposure lever 342 distant from its end 341 cooperates in a manner described below with the pin 319 which pivotally mounts the swing-lever 320 on the cocking and release lever 318. This time exposure lever 342 is provided with a shoulder 354 capable of being placed in the path of rotary movement of a projection 355 of the trailing ring 302.

The manually operable diaphragm adjusting ring 337 carries an index 345 which cooperates with a scale 346 which carries, in addition to the symbol "A" for automatic exposure determination, a series of graduations indicating different aperture sizes, so that the ring 337 can be turned either to the position illustrated in FIG. 6, for automatic exposure determination, or to any selected one of a plurality of different positions where a selected aperture will be provided in a manner described below. A projection 347 is fixed to and extends inwardly from the ring 337, as shown at the lower right portion of FIG. 6, and this projection 347 is situated in the path of rotary movement of a projection 348 of the leading ring 301. Moreover, the manually operable diaphragm adjusting means 337 fixedly carries a pivot pin 349 on which a pawl 350 is supported for rotary movement, a spring 351 acting on the pawl 350 to urge the tooth thereof into engagement with the stationary teeth 352. A manually operable release means 353 is accessible to the operator and is guided for movement inwardly toward and outwardly away from the optical axis, this release means 353 when pushed inwardly toward the optical axis by the operator engaging and displacing the pawl 350 away from the teeth 352 so as to release the ring 337 for rotary movement.

If it is desired with the structure of FIG. 6 to provide a selected aperture, then the manually operable means 336 for selecting a type of operation is turned until its index 338 is aligned with the symbol "B" for time exposures, carried by the scale 339. During this adjusting movement of the ring 336, the wider portion 340a of the slot 340 receives the pin 341 of the time exposure lever 342. Thus, by depressing the release means 353 inwardly the operator can turn the ring 337 until its index 345 is aligned with the selected aperture as indicated by the graduations on the scale 346. As a result the projection 347 is moved relative to the projection 348, and when providing relatively small apertures the projection 347 may even engage and displace the projection 348 together with the ring 301, so that the initial rest position of the ring 301 is displaced in a clockwise direction from that shown in FIG. 6. Thus, at this time, when adjusting the structure to provide a relatively small aperture it may well be that both of the rings 301 and 302 will turn as a unit in a direction opposite to that indicated by the arrow b.

In order to make an exposure, the lever 318 is manually turned in the direction of the arrow a. As a result the lever 320 engages and displaces the pin 324 of the leading ring 301 so as to turn the latter in a direction opposite to that indicated by the arrow b. Of course, the projections 307 and 310 participate in this movement so that the trailing ring 302 is also turned in the same direction. As a result both of the springs 309 and 311 are simultaneously tensioned. At the end of the cocking movement the tip of the lever 320 rides off and moves beyond the pin 324 so as to release the leading ring 301 to the tensioned spring 309. However, just before this happens, the projection 335 has closed the switch 327. The further operation of the electrical delay means is however of no interest at this time inasmuch as a time exposure is being made. During the turning of the lever 318 to cock the shutter, the time exposure lever 342 was turned by the spring 344 in the direction of the arrow c inasmuch as the pin 341 is in the wider portion 340a of the slot 340. The time exposure lever 342 is free to turn at this time because the pin 319 moves away from the lever 342 during cocking of the shutter. The time exposure lever 342 continues to turn at this time until the pin 341 engages the outer peripheral edge of the wider slot portion 340a. In this position of the time exposure lever 342 the shoulder 354 of the time exposure lever is in the path of running down movement of the projection 355 of the trailing ring 302.

When the lever 320 moves beyond the pin 324, in the direction of the arrow a, the leading ring 301 is released to the spring 309 which seeks to drive the leading ring 301 back to its rest position. However, because of the retarding means 313–316, the running down movement of the ring 301 is retarded, and the ring 301 continues its running down movement until the projection 348 engages the projection 347, so that in this way the selected aperture is provided. Thus, when providing a manually selected aperture the ring 301 cannot turn all the way back to its initial rest position. As a result the blades 303 do not fully open. The trailing ring 302, however, since its projection 355 is in engagement with the shoulder 354 of the time exposure lever 342, cannot run down, and thus the trailing ring is maintained in its cocked position so that the relative turning of the leading ring with respect to the trailing ring to the extent determined by the position of the projection 347 will determine the size of the aperture.

Only when the operator releases the shaft 317 can the lever 318 return to its initial position under the action of the spring 322 which turns the lever 318 back to its position engaging the stop 323. Inasmuch as the spring 322 is stronger than the spring 344, during the final portion of the return movement of the lever 318 to its initial position, the pin 319 engages and turns the time exposure lever 342 in opposition to the spring 344, so that the shoulder 354 is displaced away from the projection 355 of the trailing ring 302. Therefore, at this time the trailing ring 302 is released and this ring 302 runs down under the action of the spring 311 so as to terminate the exposure, the exposure being terminated when the projection 310 engages the projection 307. Thus, the exposure time will be manually determined in accordance with the length of time that the operator prevents return of the lever 318 back to its initial position. Moreover, not only is the exposure time determined in this way but in addition with the above operation the operator is provided a preselected aperture. Assuming now that the retarding means 313–316 increases the running down time of the ring 301 by approximately 1/30 sec., for example, then by way of the time exposure lever it is possible to reliably delay the initiation of the running down movement of the trailing ring 302 until the leading ring 301 has completed its running down movement.

Assuming now that it is desired to make an exposure with automatic determination of the extent to which the film was exposed, then the manually operable means 336 for selecting a type of operation is placed so that its index 338 is aligned with the symbol "A" of the scale 339, and also the operator turns the ring 337 to align the index 345 with the symbol "A" of the scale 346. At this time the rings 301 and 302 can return to their rest positions where the projection 307 of the leading ring engages the stop 308. When the operator cocks the shutter the projection 335 of the ring 301 will close the switch 327 so that the circuit 325 is closed, and of course the relay 330 becomes energized so as to swing the holding pawl 331 in a clockwise direction, as viewed in FIG. 6, to enable its arm 331b to cooperate with the projection 332 to prevent running down of the trailing ring 302. As soon as the lever 320 rides off and beyond the pin 324, the leading ring 301 is returned by the spring 309 to its rest position and the shutter blades open in order to initiate the exposure. Naturally, the projection 335 will move away from the switch 327 so that this switch opens, but in the meantime the capacitor 328 has become charged to an extent determined by the intensity of the light impinging on the photosensitive resistor 329, so that in this way after the switch 327 opens the relay 330 remains energized for a period of time determined by the lighting conditions. Upon discharge of the capacitor 328 the relay 330 becomes unenergized, the lever 331 is returned by the spring 333 to the position shown in FIG. 6, and now the spring 311 can return the ring 302 to its run-down position where its projection 310 engages the projection 307.

Figure 7:
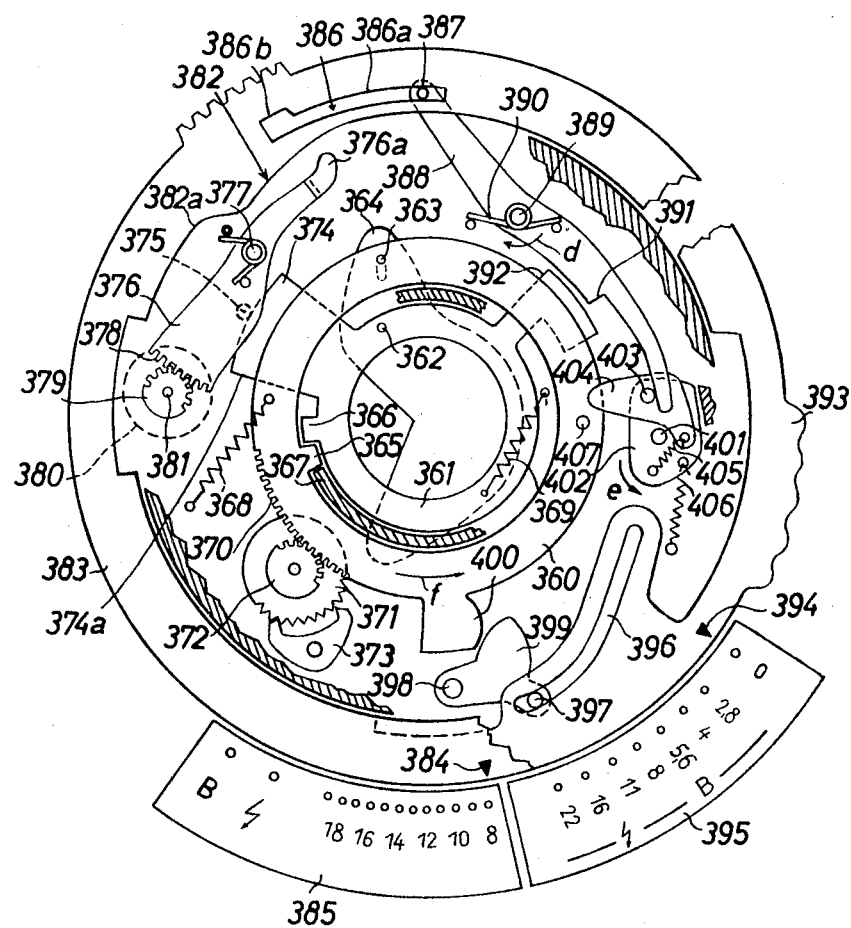
FIG. 7 shows a further embodiment of a shutter structure according to the invention.

In the embodiment of FIG. 7, there are also a pair of shutter rings, namely, the leading ring 360 and the trailing ring 361, and the ring 360 carries pins 363 extending into slots of the shutter blades 364, while the ring 361 carries pivot pins 362 which respectively pivotally connect the blades 364 to the trailing ring 361. The leading and trailing rings are respectively provided with projections 365 and 366 which engage each other in the run-down position of the parts shown in FIG. 7, and in this position the projection 365 of the leading ring 360 engages a stationary stop 367. A pair of drive springs 368 and 369 are respectively connected operatively to the rings 360 and 361 for urging them to the illustrated run-down position.

In the same way as in the embodiment of FIG. 6, the leading ring 360 is provided at a part of its periphery with gear teeth 370 which mesh with a pinion 372 fixed coaxially to an escapement wheel 371 supported with the pinion 372 for rotary movement and engaged by an anchor 373. Of course, instead of this particular type of retarding mechanism, it is also possible to use other types of known retarding mechanisms.

The trailing ring 361 is provided with a projection 374, and a pin 375 of a retarding lever 376 is adapted to be situated in the path of movement of the projection 374. The retarding lever 376 is supported for rotary movement about a pivot 377 which is fixed to the supporting structure of the shutter, and a spring urges the retarding lever 376 to turn in a counterclockwise direction, as viewed in FIG. 7. At one end the retarding lever 376 is provided with teeth 378 which mesh with a pinion 379. The pinion 379 is coaxially fixed with a rotary mass 380 which together with the pinion 379 is mounted for rotation on a shaft 381. The other end 376a of the retarding lever 376, which is angularly bent at its end 376a, is capable of being acted upon by the camming portion 382 of an adjusting ring 383 which forms a manually operable means for selecting a given type of operation. This ring 383 is provided with an index 384 movable along a stationary scale 385. The scale 385 carries a series of graduations which indicate light values, as well as a symbol for flash exposures and a symbol for time exposures.

This manually turnable ring 383 is formed with an elongated time exposure slot 386 which receives a pin 387 fixed to and projecting from a time exposure lever 388. This lever 388 is supported for rotary movement on a stationary pin 389 and is acted upon by a spring 390 which seeks to turn the time exposure lever 388 in the direction of the arrow d shown in FIG. 7. The time exposure lever 388 is furthermore provided with a shoulder 391 which, when the lever 388 is positioned for making a time exposure, is situated in the path of turning of a projection 392 of the trailing ring 361.

A manually turnable selecting ring 393 includes an index 394 which cooperates with a scale 395, and this scale carries a symbol "O" for the position in which the ring 393 is to be placed when the operator selects to provide an exposure determined by alignment of the index 384 of one of the light values of the scale 385. In addition, the scale 395 carries a series of graduations indicating apertures of different sizes. The diaphragm adjusting ring 393 has a portion provided with a camming slot 396 which receives a pin 397 fixed to and projecting from an adjustable stop 399 supported for rotary movement about a stationary pin 398. The configuration of the slot 396 is such that when the diaphragm is manually set the stop means 399 is situated in the path of running down movement of the projection 400 of the leading ring 360.

In order to cock and release the shutter of FIG. 7, the operator can, through an unillustrated transmission, turn a shaft 401 so as to turn a cocking and release lever 402 which is fixed to the shaft 401 for turning movement therewith. The lever 402 carries a pivot pin 403 on which a swing-lever 404 is mounted for free swinging movement. A spring 405 is tensioned between and connected to the levers 402 and 404, so as to urge the lever 404 against the pivot 401. A spring 406 is operatively connected with the lever 402 to urge the latter in a direction opposite to that indicated by the arrow e. The swing-lever 404, during turning of the lever 402 in the direction of the arrow e, engages and displaces a pin 407 carried by the leading ring 360, so as to displace the ring 360 in a direction opposite to that indicated by the arrow f, and of course through the stops 365 and 366 the rotation of the leading ring 360 is transmitted to the trailing ring 361, so that both rings turn as a unit during cocking of the shutter, thus preventing any displacement of the shutter blades.

Assuming now that the operator decides to make an exposure with flash illumination, using the structure of FIG. 7, then the operator will turn the ring 383 until its index 384 is aligned with the flash symbol carried by the scale 385. As a result the pin 387 of the time exposure lever 388 remains in the narrow portion 386a of the slot 386, so that the time exposure lever 388 cannot turn at this time in the direction of the arrow d. On the other hand, however, the camming portion 382a of the ring 383 at this time engages or is situated in alignment with the end 376a of the retarding lever 376. Finally, the diaphragm adjusting ring 393 is turned so that its index 394 is aligned with the graduation corresponding to the selected aperture which is to be used for the flash exposure.

Now when the operator turns the cocking and release lever 402 in the direction of the arrow e, the swing-lever 404 engages the pin 407 so as to cock the shutter rings as pointed out above. Toward the end of the cocking movement, the pin 375 of the retarding lever 376 becomes situated in front of the edge 374a of the projection 374.

As soon as the swing-lever 404 rides off and moves beyond the pin 407, the leading ring 360 runs down in the direction of the arrow *f*, and of course at this time the leading ring is retarded by the retarding means 371–373. At the same time, the projection 374 of the ring 361 attempts to turn in a counterclockwise direction, as viewed in FIG. 7, but this projection 374 simply presses with its edge 374a on the pin 375 so as to turn the lever 376 in a clockwise direction, as viewed in FIG. 7, and the retarding means 371–373, on the one hand, and 376–381, on the other hand, are so interrelated that when the parts are set for a flash exposure the pin 375 will be pressed beyond and will ride off the left end of the edge 374a, as viewed in FIG. 7, at the moment when the leading ring 360 has returned all the way to its rest or run-down position for an adjustment where the largest aperture is provided. Therefore, with this construction it cannot happen that the trailing ring will be released before completion of the running down of the leading ring.

When a given aperture is selected, the projection 400 of the leading ring 360 will engage the stop lever 399 before the leading ring 360 can return all the way to its initial rest position, and thus the leading ring 360 is held in a position displaced from the position where the projection 365 engages the stop 367, so that in this way an aperture smaller than the largest possible aperture can be provided. As soon as the spring 369 has turned the trailing ring 361 through an angle sufficient to displace the pin 375 into engagement with the outer periphery of the projection 374, the trailing ring 361 can run down with practically no retarding, and thus the exposure aperture is closed.

In order to make a time exposure, the selecting ring 383 is turned until the index 384 is aligned with the symbol "B." In this position the pin 387 of the time exposure lever 388 is situated in the wider part 386b of the time exposure slot 386. Now when the shutter is actuated to make an exposure, the shoulder 391 of the lever 388, in the same way as described above in connection with FIG. 6, is situated in the path of movement of the projection 392 of the trailing ring 361 so that the latter remains in its cocked position as long as the operator does not release the cocking and release lever 402.

When the operator turns the ring 383 to align its index 384 with a selected light value of the scale 385, then of course the camming portion 382 will have with respect to the retarding lever 376 a position which will provide an exposure according to the selected light value.

Figure 8:
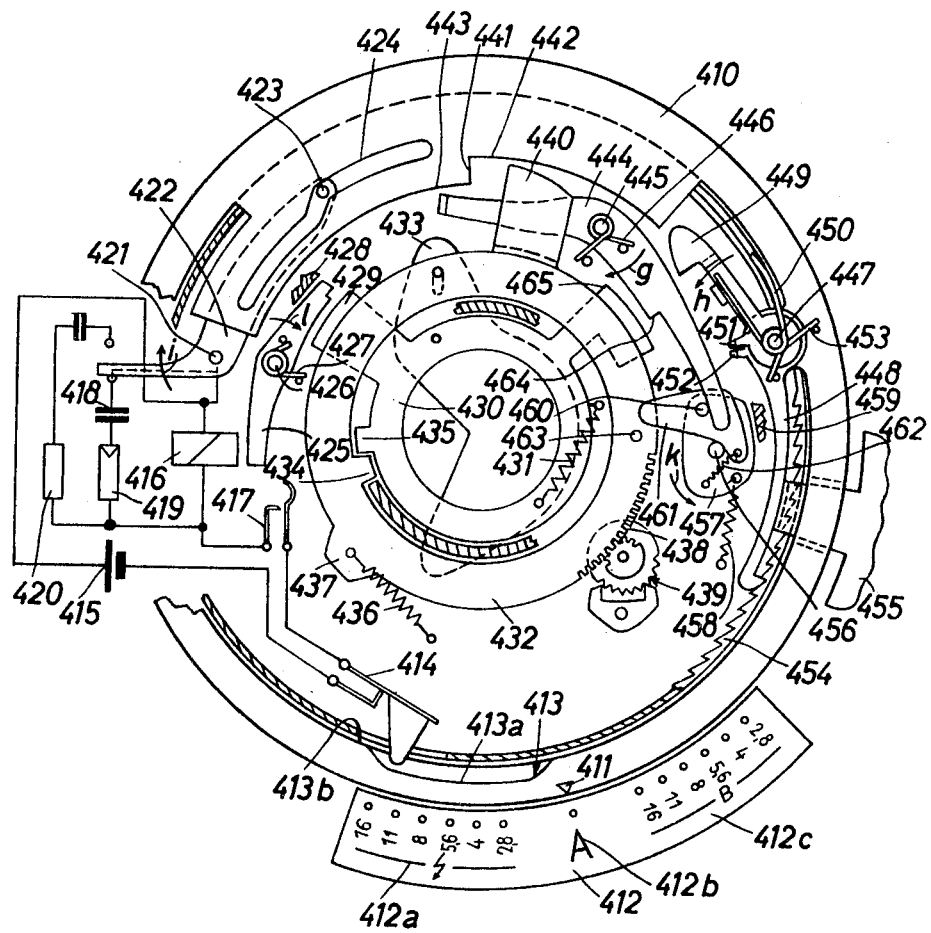
FIG. 8 is a partly schematic sectional elevation of yet another embodiment of the shutter of the invention.

The embodiment of FIG. 8 differs from that of FIG. 6 primarily in that the manually operable rings of FIG. 6 are combined into a single manually operable ring 410 in the embodiment of FIG. 8. The ring 410 carries an index 411 which cooperates with a stationary scale 412. The scale 412 has a section 412a, carrying a series of graduations of aperture sizes as well as a flash symbol, a central section 412b provided with the automatic symbol "A," and a third section 412c which again has a series of graduations indicating different aperture sizes, but the section 412c carries the symbol for time exposures. The adjusting ring 410 is provided with an internal camming portion 413 having a pair of sections 413a and 413b, for actuating an operating switch 414 of an electrical delay means of this embodiment. The electrical delay means includes a current source 415, a relay 416 and a control switch 417, all of which are connected in series with each other and with the operating switch 414. Parallel to the relay 416 is a circuit portion including a capacitor 418 and a photosensitive resistor 419 in series with the capacitor 418, or a circuit portion which includes a fixed resistor 420, and a means is provided for connecting either the capacitor 418 and photosensitive resistor 419, on the one hand, into the circuit in parallel with the relay 416, or the fixed resistor 420, on the other hand, in parallel with the relay 416. In other words, these two circuit portions, one provided with the resistor 420, and the other provided with the series-connected capacitor 418 and photosensitive resistor 419 cannot be simultaneously connected into the circuit.

In order to altenately connect these circuit portions into the circuit, a lever 422 is supported for movement by a pin 421 which is fixed to the supporting structure of the shutter, and one arm of the lever 422 provides an electrically conductive connection between either the photosensitive resistor 419 or the fixed resistor 420 and the relay 416. The other arm of the lever 422 carries a pin 423 extending into a control slot 424 formed in the adjusting ring 410.

The relay 416 cooperates with a holding pawl 425 which is supported for turning movement about a stationary pin 426 and which is acted upon by a spring 427 which seeks to turn the pawl 425 in a counterclockwise direction, as viewed in FIG. 8, against a stationary stop 428. The pawl 425, upon energizing of the relay 416, is turned in the direction of the arrow *l* and becomes located in the path of movement of a projection 429 of the trailing ring 430 of this embodiment. The trailing ring 430 is acted upon by a drive spring 431 and has a projection 435 engaging a projection 434 of the leading ring 432, and these rings turn to operate the shutter blades 433 in the manner described above. The leading ring 432, which is acted upon by a drive spring 436, is provided, in the same way as the ring 301 of FIG. 6, with a control projection 437 for actuating a control switch 417. Also, the leading ring 432 has at its periphery teeth 438 which mesh with a pinion fixed to an escapement wheel to turn therewith about a common axis, the escapement wheel cooperating with an escapement anchor, and this entire retarding mechanism being indicated at 439. Furthermore, the leading ring 432 is provided with a projection 440, and a shoulder 441 of the adjusting ring 410 is situated in the path of running down movement of the projection 440, the shoulder 441 and the projection 440 cooperating during flash exposures. The shoulder 441 is situated between a pair of inner peripheral edges 442 and 443 of the ring 410, and these edges serve to control a time exposure lever 444 which is supported for rotary movement about a stationary pin 445 and which is acted upon by a spring 446 which seeks to turn the lever 444 in the direction of the arrow *g*. The adjusting ring 410 carries a pin 447 on which a pawl 448 is supported for rotary movement and on which a holding pawl 449 is also supported for turning movement independently of the pawl 448. Between the ring 410 and the pawl 449 is a spring 450 which seeks to turn the pawl 449 in the direction of the arrow *h* until the projection 451 of the pawl 449 engages a projection 452 of the pawl 448. A further spring 453 is in operative engagement with the ring 410 and the pawl 448 then seeks to maintain the latter in engagement with the stationary ratchet teeth 454. A manually operable release means 455 is available to the operator for moving the pawl 448 away from the teeth 454.

In order to cock and release the shutter, this embodiment also includes a lever 457 fixed to a rotary shaft 456 which is capable of being turned by the operator in the direction of the arrow *k*, and a spring 458 turns the lever 457 until it engages a stationary stop 459. The lever 457 carries a pivot pin 460 which serves to pivotally mount on the lever 457 a swing-lever 461, and a spring 462 is tensioned between and connected to the levers 457 and 461 to urge the latter into engagement with the shaft 456. The lever 461, during cocking of the shutter, engages a pin 463 carried by the leading ring 432 in order to turn the latter and the trailing ring 430 therewith, in the manner described above.

Assuming now that the operator desires to make a flash exposure with a preselected aperture, then the adjusting ring 410, after the release member 455 is pressed inwardly, is turned until its index 411 is aligned with the selected graduation of the portion 412a of the scale 412. During this adjusting movement the lever 42 is acted upon by the slot 424 so as to be turned in the direction of the arrow *i*, so that now instead of having the capacitor 418 and resistor 419 in the circuit, only the fixed resistor 420 is in the circuit. Moreover, during this adjustment the shoulder 441 of the ring 410 engages the projection 440 of the leading ring 432 and turns the latter, except when the largest possible aperture has been selected, the ring 432 being turned at this time in a clockwise direction, as viewed in FIG. 8, through an angular distance determined by the selected aperture. Now when the operator turns the shaft 456 together with the lever 457, in the direction of the arrow *k*, the lever 461 will engage and displace the pin 463 so as to displace the shutter rings to their cocked position. The projections 434 and 435 of course cooperate to transmit turning of ring 432 to ring 430. Just before the tip of the lever 461 rides off and moves beyond the pin 463, the projection 437 of the leading ring 432 closes the switch 417. Therefore, current can now flow through the relay 416 of the electrical delay means, and the result is that the holding pawl 425 is turned in the direction of the arrow *l*. Thus, a part of the holding pawl 425 becomes situated in front of the projection 429 of the trailing ring 430 so as to prevent return of the latter to its run-down position.

As soon as the lever 461 rides off and moves beyond the pin 463, the leading ring 432 can be driven back toward its rest position in a counterclockwise direction, by the spring 436, the running down movement of the ring 432 being retarded by the retarding means 439. As a result the blades 433 are opened to provide an exposure aperture according to the selected size of the aperture. In the embodiment of FIG. 8 it is to be noted that the size of the exposure aperture is determined by the extent to which the movement of the leading ring 432 back toward its rest position is limited by the location of the shoulder 441 in the path of movement of the projection 440. Of course, during the initial part of the running down movement of the ring 432 the switch 417 again opens so that the flow of current in the delay circuit is interrupted. The resistor 420 acts as a shunt resistor to delay the deenergizing of the relay 416, because the compensating current flows through the shunt circuit along its own winding. The delay period depends upon the resistance of the fixed resistor 420, and this resistance is so chosen that an exposure time of approximately $\frac{1}{30}$ sec. will be provided. The retarding means 439 is again designed so that at an exposure time of $\frac{1}{30}$ sec. the leading ring 432 can turn all the way back to its initial position, assuming the largest aperture, before the trailing ring 430 is released for running down movement.

Upon deenergizing of the relay 416, the holding pawl 425 is returned by the spring 427 to the position illustrated in FIG. 8 where it engages the stop 428. Thus, the trailing ring 430 is released for running down movement, so that the exposure aperture is again closed.

To make a time exposure, the adjusting ring 410, after the operator depresses the release means 455, is turned until its index 411 is aligned with a selected aperture at the scale portion 412c of the scale 412. Now the camming portion 413b of the cam 413 will engage and open the switch 414. Therefore, no current can flow in the delay circuit, irrespective of whether the switch 417 is opened or closed. It is to be noted that with this adjustment the shoulder 441 is turned in a counterclockwise direction, as viewed in FIG. 8, so that the peripheral edge portion 442 of the ring 410 is situated in alignment with the left end of the time exposure lever 444, so that now when the operator turns the lever 457 in the direction of the arrow *k*, the time exposure lever 444 will be free to be turned by the spring 446 in the direction of the arrow *g*, the spring 446 maintaining the lever 444 in engagement with the pin 460 at this time. Moreover, it is to be noted that the holding pawl 449 has been returned to a position determined by the selected aperture.

Assuming now that the operator turns the lever 457 in the direction of the arrow *k*, so as to cock the shutter in the manner described above, then of course the projection 440 of the leading ring 432 deflects the pawl 449 as the projection 440 moves past the pawl 449, and when the left edge of the projection 440 moves beyond the tooth of the pawl 449, the spring 450 acts on the pawl 449 to snap its tooth behin dthe projection 440. In this way the pawl 449 becomes located in the path of movement of the projection 440. Moreover, during turning of the lever 457 in the direction of the arrow *k*, the time exposure lever 444 follows the pin 460 in the direction of the arrow *g*. Therefore, the shoulder 464 of the time exposure lever becomes situated in the path of movement of the projection 465 of the trailing ring 430.

As soon as the lever 461 moves beyond the pin 463, the leading ring 432 turns in a counterclockwise direction, until the stop 440 engages the holding pawl 449. In this way an aperture according to the selected size is provided. Now when the operator releases the lever 457, the spring 458 will return it to the rest position shown in FIG. 8, and as a result the time exposure lever 444 is returned in a direction opposite to that indicated by the arrow *g* so that the shoulder 464 is situated beyond the path of movement of the projection 465. Now the trailing ring 430 can be driven by the spring 431 also in a counterclockwise direction, and thus the exposure aperture is closed.

It is to be noted that the structure is shown in FIG. 8 in the position for providing automatic determination of the exposure, inasmuch as the index 411 is aligned with the symbol "A." At this time the switch 414 is closed and the circuit which includes the capacitor 418 and the photosensitive resistor 419 is connected into the circuit. Therefore, as soon as the switch 417 is closed by the projection 437 current will flow through the delay circuit and the relay 416 will become energized to place the lever 425 in a position situated in the path of movement of the projection 429 of the trailing ring 430. When the lever 461 rides off and moves beyond the pin 463, and this is the moment when the shutter is fully cocked the ring 432 is released to be returned to its rest position by the spring 436, with the result that the switch 417 again opens in a manner determined by the extent to which the capacitor 418 has been charged by light impinging on the photosensitive resistor 419. Therefore, the discharge of the capacitor 418 upon opening of the switch 417 maintains the delay circuit energized for a period of time determined by the lighting conditions, and it is these lighting conditions which determine the exposure time inasmuch as the lever 425 cooperates with the projection 429 to delay return of the trailing ring 430. As soon as the relay 416 becomes unenergized the parts return to the position shown in FIG. 8.

Figure 9:
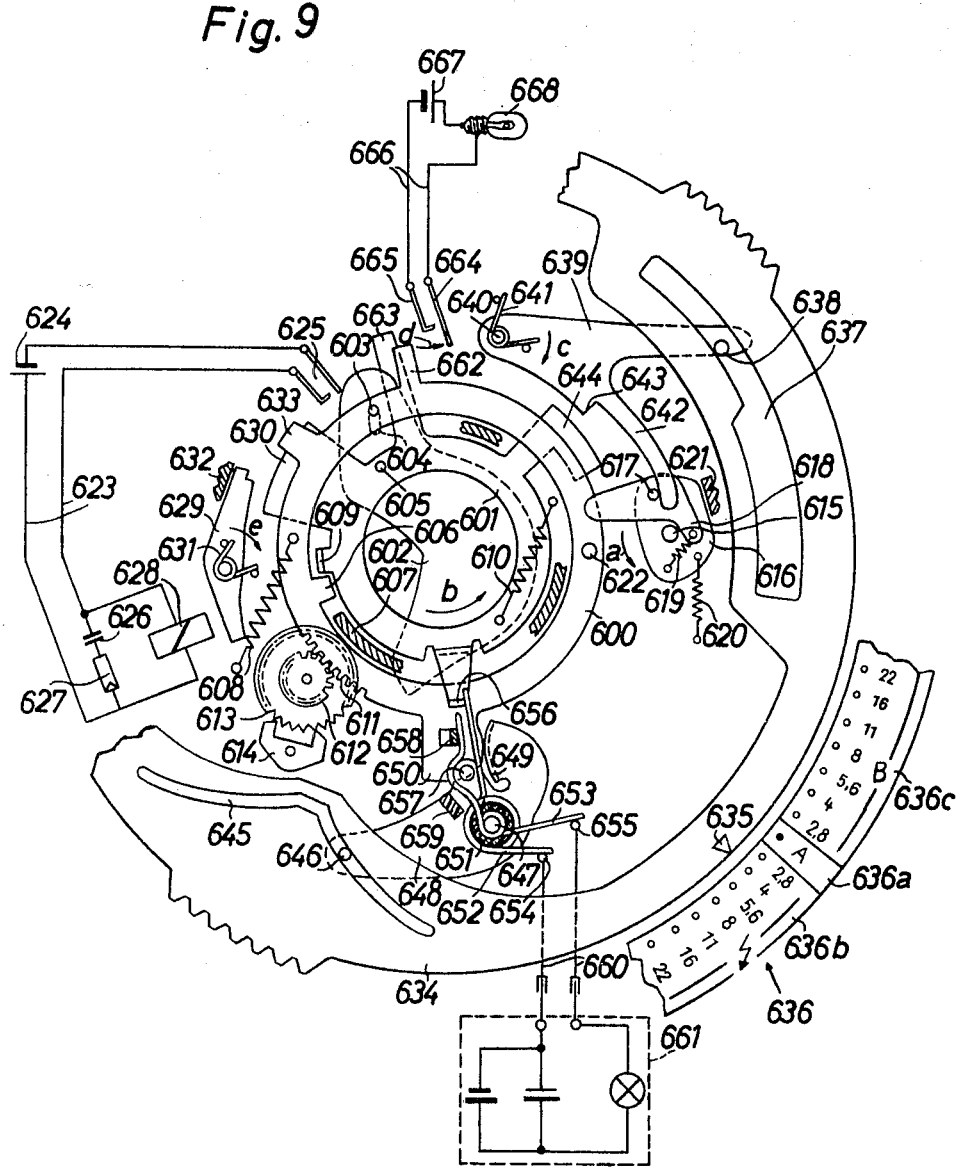
FIG. 9 is a fragmentary partly sectional and partly schematic elevational view of yet another embodiment of a shutter assembly according to the invention.

Referring now to FIG. 9, it will be seen that the embodiment of the invention illustrated therein includes the leading and trailing rings 600, 601, respectively. The leading ring 600 carries a plurality of pins 603 which are respectively received in slots 604 formed in the plurality of shutter blades 602. The trailing ring 601 fixedly carries a plurality of pivot pins 605 which respectively pivotally connect the shutter blades 602 to the trailing ring 601. Therefore, during relative turning of the rings 600 and 601, the blades will turn relative to each other.

The leading ring 600 is provided with an inwardly directed stop projection 606 which is movable into engagement with a stationary stop 607 in order to limit the turning movement of the leading ring by its drive spring 608, so that in this way the rest or run-down position of the leading ring 600 is determined. The stop 606 cooperates with a stop 609 which is integral with the ring 601, and the drive spring 610 of the ring 601 can thus turn the latter until its stop 609 engages the stop 606. The leading ring 600 is formed at a part of its periphery with gear teeth 611 which mesh with a pinion 612. The pinion 612 is fixed coaxially with an escapement wheel 613, and the escapement wheel 613 together with the pinion 612 are mounted for rotation about a common axis. An anchor 614 cooperates with the escapement wheel 613.

In order to cock and release the shutter, the operator can turn a shaft 615 which is connected through an unillustrated transmission to an element which is accessible to the operator for turning the shaft 615. This shaft 615 fixedly carries the cocking and release lever 616. The lever 616 carries a pivot pin 617 on which a swing-lever 618 is turnably mounted, and a spring 619 is tensioned between and connected to the levers 616 and 618 so as to urge the latter into engagement with the shaft 615. An additional spring 620 is operatively connected to the lever 616 for urging the latter into engagement with a stationary stop 621. When the operator turns the lever 616 in the direction of the arrow $a$ of FIG. 9, the swing-lever 618 engages a pin 622 fixedly carried by the leading ring 600 so as to turn the latter together with the trailing ring 601, in opposition to the springs 608 and 610, respectively, in a direction opposite to that indicated by the arrow $b$ in FIG. 9, and in this way the shutter is cocked.

In order to make daylight exposures an electrical delay means is provided to cooperate with the ring 601. This delay means includes the circuit 623 in which a current source 624, such as a battery or miniature cell, a control switch 625, a capacitor 626, and a photosensitive resistor 627 are all electrically connected to each other in series. Preferably the source of current 624 and the capacitor 626 are situated in the interior of the camera while the photosensitive resistor 627 is situated at the front side of the camera where it is exposed to the same light as that which reaches the objective of the camera. Connected in parallel with the series-connected resistor 627 and capacitor 626 is a relay 628 which controls the position of a lever 629 part of which acts as an armature of the relay 628. This lever 629 is adapted to cooperate with a projection 630 of the trailing ring 601. A spring 631 urges the lever 629 to its illustrated rest position where it engages a stationary stop 632. When the relay 628 is energized the lever 629 is turned in the direction of the arrow $e$, and it is capable of engaging an end of the projection 630 to prevent running down of the trailing ring 601.

The control switch 625 is a normally open switch capable of being closed by the projection 633 of the leading ring 600 during the cocking movement of the latter. Just before the lever 618 rides off and moves beyond the pin 622 the projection 633 engages the switch 625 to close the latter. Of course, the closing of the switch 625 will result in energizing of the relay 628 so as to turn the holding lever 629 to the position where it engages the projection 630 to maintain the trailing ring 601 in its cocked position after the leading ring 600 has started to run down. The electrical delay means is designed in such a way that the time required for the relay 628 to become deenergized, under minimum lighting conditions for daylight exposures, provides a delay for the ring 601 which is at least equal to the time required for the leading ring 600 to move all the way back to the run-down position thereof where its projection 606 engages the stop 607. In this way there is an assurance that the trailing ring 601 will not be released for unretarded running down movement before the leading ring 600 completes its running down movement even under low lighting conditions, as, for example, under condtions where exposures are made with flash illumination.

In order to be able to manually adjust the assembly so as to provide selected apertures, a manually operable means in the form of a ring 634 is provided, this ring 634 being manipulated by the operator for the purpose of selecting a given type of operation as well as for the purpose of selecting a given aperture. The ring 634 carries an index 635 which cooperates with a stationary scale 636. The scale 636 is divided into three sections, namely, a central section 636$a$, provided with the symbol "A" for automatic operation, a section 636$b$ provided with aperture graduations and adapted to be used with flash exposures, and a section 636$c$ also provided with aperture graduations but adapted to be used with time exposures.

The ring 634 is formed with a time exposure slot 637 which receives a pin 638 carried by a time exposure lever 639. The time exposure lever 639 is supported for turning movement by a stationary pin 640 and is acted upon by a spring 641 which seeks to turn the lever 639 in the direction of the arrow $c$. The lever 639 has an arm 642 which engages the pin 617 which pivotally mounts the swing-lever 618 on the cocking and release lever 616. The time exposure lever 639 in addition is provided with a stop shoulder 643 capable of being situated in the path of movement of a projection 644 of the trailing ring 601. The ring 634 is also formed with a camming slot 645 which receives a pin 646 of a lever 648 which is supported for turning movement by a stationary pin 647. The lever 648 is provided with a stop portion 649 situated in the path of movement of a projection 650 of the leading ring 600. A mounting member 651 of electrically non-conductive material is fixedly carried by the lever 648 and mounts thereon a pair of springy contacts 652 and 653 which are insulated from each other by the mounting member 651. These springy contacts are under a certain prestress so that the springy contacts always engage the stationary contacts 654 and 655, respectively. The springy contact 652 also engages either a projection 656 of the ring 601, this projection being made of electrically non-conductive material, or a projection 657 carried by the lever 648 and also made of electrically non-conductive material. The other springy contact 653 engages either a projection 658 made of electrically non-conductive material and carried by the projection 650 of the leading ring 600 or a projection 659 made of electrically non-conductive material and carried by the lever 648. The pair of stationary contacts 654 and 655 are electrically connected with the parts 660 of the camera, these parts 660 forming part of an ignition circuit of an electronic flash device 661. As is indicated in FIG. 9, in a schematic manner, a conventional electronic flash device 661 can be detachably connected to the camera so as to be electrically connected with the parts 660, although it is of course possible to permanently connect the electronic flash device with the camera so that the electronic flash device is built into the camera.

The leading and trailing rings are also respectively provided with control projections 662 and 663, shown at the upper portion of FIG. 9, and these control projections respectively cooperate with springy contacts 664 and 665 of a control switch similar to the switch 200 of FIG. 1. This switch 664, 665 forms a control switch of a circuit 666 of a flash assembly which uses conventional flash lamps 668, this circuit 666 being schematically indicated and including the source of current 667. The projection 662 is capable of deflecting the contact 664 to the right, as viewed in FIG. 9, away from its illustrated rest position while the projection 663 is capable of deflecting the contact 665 also to the right away from its rest position, the contacts 664 and 665 normally being out of engagement with each other, as indicated in FIG. 9. The conventional flash device which includes the circuit 666 can either be built into the camera or can be detachably connected thereto.

In order to make an exposure with the eelctronic flash device 661, the ring 634 is turned until its index 635 is aligned with a selected graduation of the section 636$b$ of the scale 636. In this position of the ring 634 the camming slot 645 thereof has placed the lever 648 in a predetermined angular position where the stop portion 649 of the lever 648 is in a location corresponding to the selected graduation of the scale section 636$b$. Then the operator turns the shaft 615 so as to turn the lever 616 in the direction of the arrow $a$ of FIG. 9, so that the lever 618 engages the pin 622 in order to cock the shutter, the rings 600 and 601 turning together at this time in a direction opposite to that indicated by the arrow $b$ in FIG. 9. The engagement of the projection 606 with the projection 609 causes the trailing ring 601 to turn together with the leading ring 600, without any relative movement therebetween, during cocking of the shutter. Just before the swing-lever 618 rides off the pin 622, the projection 633 of the leading ring 600 closes the control switch 625 so that the circuit 623 is closed and current flows therethrough. The result is that the relay 628 is energized and turns the holding pawl 629 in the direction of the arrow $e$ of FIG. 9, until the holding pawl is situated in the path of movement of the projection 630 so as to prevent running down of the trailing ring 601. As soon as the swing-lever 618 moves beyond the pin 622, the leading ring 600 is driven back toward its rest position by the spring 608, the ring 600 turning at this time in the direction of the arrow $b$ of FIG. 9, and thus the shutter blades 602 are turned so as to provide the exposure aperture.

During the cocking of the shutter, the projections 656 and 658 turn away from the springy contacts 652 and 653, respectively, so that these contacts move into engagement with the projections 657 and 659. During the running down movement of the leading ring 600, while the trailing ring 601 is retained in its cocked position by the holding lever 629, the projection 658 of the leading ring 600 engages the end portion of the spring contact 653 distinct from the stationary contact 655 and displaces the contact 653 into engagement with the contact 652 which at this time is still in engagement with the projection 657. Thus, the leading ring 600 closes the circuit 660 to energize the electronic flash device 661. In this way the electronic flash device is ignited. The contact 653 is displaced into engagement with the contact 652 just before the projection 650 of the leading ring 690 engages the stop portion 649. The cam 645 together with the pin 646 have placed the lever 648 in a position where the selected aperture will be provided when the projection 650 engages the projection 649.

Of course, the running down of the leading ring 600 has displaced the projection 633 away from the switch 625 so that the latter opens and the circuit 623 responds to deenergize the relay 628 in accordance with the light impinging on the resistor 627, the light being reflected from the electronic flash to the resistor 627 from the subject which is photographed, in a manner similar to that described above in connection with FIG. 1.

Of course, when the electronic flash device is used the operator will not place a lamp 668 in the circuit 666, so that the other flash device is not actuated. When it is desired to use this other flash device, then the operator of course will not contact the electronic flash device to the camera. The control switch 664, 665 is actuated by the projections 662, 663 in the same way as described above in connection with the switch 200 of FIG. 1, the projections 662, 663 respectively corresponding to the projections 203 and 204 of FIG. 1 and operating in the same way.

Daylight exposures of course are made without the use of either flash device, and in this case the index 635 is aligned with the scale portion 636a and the exposure time as well as the aperture are determined by the light impinging on the photosensitive resistor 627, as described above in connection with the other embodiments of the invention.

When making time exposures the operator will place the index 635 in alignment with a selected graduation of the scale portion 636c, and at this time the wider portion of the time exposure slot 637 will receive the pin 638, so that at this time when the pin 617 turns in the direction of the arrow $a$ of FIG. 9, the spring 640 will be capable of displacing the time exposure lever 639 to position its shoulder 643 in the path of movement of the projection 644 of the trailing ring 601, and thus the trailing ring 601 will be maintained in the cocked position until the operator releases the lever 616.

It will be understood that each of the elements described above, or two or more together, may also find a useful application in other types of camera differing from the types described above.

While the invention has been illustrated and described as embodied in camera shutters, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be secured by Letters Patent is:

1. In a camera, in combination, leading and trailing coaxial rotary shutter rings turnable together from a rest to a cocked position, said leading ring turning in advance of said trailing ring from said cocked to said rest position, so that shutter blades operatively connected to said rings will assume an open position, and said trailing ring then following said leading ring from said cocked to said rest position to close the shutter blades and terminate an exposure; flash means for making an exposure with flash illumination, said flash means including an electrical circuit and a switch forming part of said circuit for closing said circuit and igniting a flash device when said switch is closed, and means carried by said leading ring and cooperating with said switch for closing the latter during the initial part of the running down movement of said leading ring from said cocked to said rest position; and means carried by said trailing ring and engaging said switch for opening the latter during the running down movement of said trailing ring from said cocked to said rest position, said means carried by said leading ring for closing said switch and said means carried by said trailing ring for opening said switch including a pair of members, respectively, fixedly carried by said rings and projecting therefrom, said switch including movable contacts respectively engaged by said members, said contacts of said switch being in the form of elongated springy contacts capable of being deflected and assuming when unstressed a position out of engagement with each other so that said switch is normally open, said members respectively engaging said contacts and deflecting the latter during cocking of said rings without placing said contacts in engagement with each other so that said switch is still open when said rings are in said cocked position.

2. In a camera, in combination, coaxial rotary leading and trailing shutter rings and shutter blades operatively connected thereto, said rings turning together from a rest position to a cocked position while said shutter blades remain closed and said leading ring turning in advance of said trailing ring from said cocked to said rest position to open said shutter blades while said trailing ring then moves from said cocked to said rest position to return said blades to said closed position and terminate an exposure; adjustable limiting means located in the path of return movement of said leading ring to adjust the extent to which the latter can return toward said rest position thereof; delay means operatively connected to said trailing ring for delaying the return thereof from said cocked towrad said rest position until after said leading ring has completed its return movement, whereby said adjustable limiting means and said delay means cooperate with said rings to provide a selected aperture; and retarding means operatively connected to said leading ring for constantly retarding the running down movement thereof.

3. In a camera, in combination, coaxial rotary leading and trailing shutter rings and shutter blades operatively connected thereto, said rings turning together from a rest position to a cocked position while said shutter blades remain closed and said leading ring turning in advance of said trailing ring from said cocked to said rest position to open said shutter blades while said trailing ring then moves from said cocked to said rest position to return said blades to said closed position and terminate an exposure; adjustable limiting means located in the path of return movement of said leading ring to adjust the extent to which the latter can return toward said rest position thereof; delay means operatively connected to said trailing ring for delaying the return thereof from said cocked toward said rest position until after said leading ring has completed its return movement, whereby said adjustable limiting means and said delay means cooperate with said rings to provide a selected aperture, said delay means being manually operable for delaying the return of said trailing ring from said cocked toward said rest position for a period of time which is manually determined by the operator so that a time exposure can be made; and retarding means operatively connected to said leading ring for constantly retarding the running down movement thereof.

4. In a camera, in combination, coaxial rotary leading and trailing shutter rings and shutter blades operatively connected thereto, said rings turning together from a rest position to a cocked position while said shutter blades remain closed and said leading ring turning in advance of said trailing ring from said cocked to said rest position to open said shutter blades while said trailing ring then moves from said cocked to said rest position to return said blades to said closed position and terminate an exposure; adjustable limiting means located in the path of return movement of said leading ring to adjust the extent to which the latter can return toward said rest position thereof; delay means operatively connected to said trailing ring for delaying the return thereof from said cocked toward said rest position until after said leading ring has completed its return movement, whereby said adjustable limiting means and said delay means cooperate with said rings to provide a selected aperture, said delay means being in the form of a retarding mechanism which retards the return movement of said trailing ring from said cocked toward said rest position thereof.

5. In a camera, in combination, coaxial rotary leading and trailing shutter rings turnable together from a rest to a cocked position, said leading ring turning in advance of said trailing ring from said cocked toward said rest position for opening a shutter of which said rings form a part and said trailing ring then following said leading ring from said cocked to said rest position for closing the shutter and terminating the exposure; a pair of retarding means respectively connected operatively to said rings for retarding the running down movement thereof from said cocked to said rest position; first manually operable means operatively connected to said retarding means which cooperates with said trailing ring for placin the latter retarding means into or out of operation; and second manually operable means adjustably positioning in the path of movement of said leading ring from said cocked toward said rest position a stop member which limits the extent to which said leading ring can return toward said rest position thereof, whereby said second manually operable means can provide a selected aperture.

6. In a camera, in combination, coaxial rotary leading and trailing shutter rings turnable together from a rest to a cocked position, said leading ring turning in advance of said trailing ring from said cocked toward said rest position for opening a shutter of which said rings form a part and said trailing ring then following said leading ring from said cocked to said rest position for closing the shutter and terminating the exposure; a pair of retarding means respectively connected operatively to said rings for retarding the running downward movement thereof from said cocked to said rest position; and a single manually operable means operatively connected to the retarding means which coacts with said trailing ring for setting the latter retarding means into or out of operation and also operatively connected to said leading ring for adjustably limiting the extent to which the latter can return toward said rest position thereof so as to provide a selected aperture.

7. In a camera, in combination, coaxial rotary leading and trailing shutter rings turnable together from a rest to a cocked position, said leading ring turning in advance of said trailing ring from said cocked toward said rest position for opening a shutter of which said rings form a part and said trailing ring then following said leading ring from said cocked to said rest position for closing the shutter and terminating the exposure; a pair of retarding means respectively connected operatively to said rings for retarding the running down movement thereof from said cocked to said rest position; a single manually operable means operatively connected to the retarding means which coacts with said trailing ring for setting the latter retarding means into or out of operation and also operatively connected to said leading ring for adjustable limiting the extent to which the latter can return toward said rest position thereof so as to provide a selected aperture: stop means situated in the path of movement of said leading ring from said cocked toward said rest position thereof, said manually operable means being operatively connected to said stop means for adjusting the position thereof so as to adjust the extent to which said leading ring can return toward said rest position thereof.

8. In a camera, in combination, coaxial rotary leading and trailing shutter rings turnable together from a rest to a cocked position, said leading ring turning in advance of said trailing ring from said cocked toward said rest position for opening a shutter of which said rings form a part and said trailing ring then following said leading ring from said cocked to said rest position for closing the shutter and terminating the exposure; a pair of retarding means respectively connected operatively to said rings for retarding the running down movement thereof from said cocked to said rest position; a single manually operable means operatively connected to the retarding means which coacts with said trailing ring for setting the latter retarding means into or out of operation and also operatively connected to said leading ring for adjustably limiting extent to which the latter can return toward said rest position thereof so as to provide a elected aperture; stop means situated in the path of movement of said leading ring from said cocked toward said rest position thereof, said manually operable means being operatively connected to said stop means for adjusting the position thereof so as to adjust the extent to which said leading ring can return toward said rest position thereof, said stop means being mounted for adjustable movement and said manually operable means having a camming portion cooperating with said stop means for determining the position thereof.

9. In a camera, in combination, shutter means including a pair of rotary shutter rings one of which is a leading ring and the other of which is a trailing ring, said leading ring having a projection and both of said rings turning together from a rest to a cocked position while said leading ring turns in advance of said trailing ring from said cocked to said rest position to open the shutter means while said trailing ring then follows from the cocked to the rest position to close said shutter means; retarding means operatively connected with said leading ring for constantly retarding the running down movement thereof from said cocked to said rest position; spring-pressed pawl means past which said projection of said leading ring moves during turning of said leading ring from said rest to said cocked position, so that said spring-pressed pawl means snaps in front of said projection to engage the latter and limit the extent to which said leading ring can return from said cocked toward said rest position, so as to determine the size of the aperture provided by said shutter means, and manually operable means operatively connected to said spring-pressed pawl means for determining the position thereof along the path of movement of said projection so as to determine the size of the aperture.

10. In a camera, in combination, shutter means including a pair of rotary shutter rings one of which is a leading ring and the other of which is a trailing ring, said leading ring having a projection and both said rings turning together from a rest to a cocked position while said leading ring turns in advance of said trailing ring from said cocked to said rest position to open the shutter means while said trailing ring then follows from the cocked to the rest position to close said shutter means; retarding means operatively connected with said leading ring for constantly retarding the running down movement thereof from said cocked to said rest position; spring-pressed pawl means past which said projection of said leading ring moves during turning of said leading ring from said rest to said cocked position, so that said spring-pressed pawl means snaps in front of said projection to engage the latter and limit the extent to which said leading ring can return from said cocked toward said rest position, so as to determine the size of the aperture provided by said shutter means, and manually operable means operatively connected to said spring-pressed pawl means for determining the position thereof along the path of movement of said projection so as to determine the size of the aperture; second spring-pressed pawl means carried by said manually operable means, stationary tooth means engaged by said second pawl means for retaining said manually operable means and both of said pawl means in a selected position, and second manually operable means engaging said second pawl means for displacing the latter away from said tooth means to release said manually operable means for movement, said first-mentioned pawl means and said second pawl means both having projections engaging each other, respectively, so that when said second pawl means is displaced by said second manually operable means from said toothed means, said first-mentioned pawl means will be displaced to a position situated beyond the path of movement of said projection.

11. In a camera, in combination, shutter means including leading and trailing coaxial shutter rings turnable together from a rest to a cocked position while the shutter remains closed, said leading ring turning in advance of said trailing ring from said cocked to said rest position to open said shutter means and said trailing ring then turning from said cocked to said rest position to close said shutter means; a pair of retarding means respectively coacting with said rings for retarding the return movement thereof from said cocked toward said rest positions, respectively; and manually operable means having a camming portion coopering with said retarding means which coacts with said trailing ring for controlling the latter retarding means.

12. In a camera, in combination, shutter means including leading and trailing coaxial rotary rings turnable together from a rest to a cocked position while the shutter means remains closed, said leading ring turning in advance of said trailing ring from said cocked to said rest position to open said shutter means and said trailing ring then turning from said cocked to said rest position to close said shutter means; retarding means operatively connected to said leading ring for constantly retarding the return movement thereof from said cocked toward said rest position; electrical delay means operatively connected to said trailing ring for electrically determining the delay before said trailing ring is released for return movement from said cocked to said rest position thereof, said electrical delay means including a fixed resistor; and manually operable cam means cooperating with said fixed resistor for selectively placing the latter into or out of the circuit of said electrical delay means.

13. In a camera, in combination, shutter means including coaxial rotary leading and trailing shutter rings turnable together from a rest to a cocked position, said leading ring turning from said cocked to said rest position in advance of said trailing ring for opening said shutter means, and said trailing ring then turnng from said cocked to said rest position for closing said shutter means; retarding means operatively connected to said leading ring for constantly retarding the return movement thereof from said cocked to said rest position; electrical delay means operatively connected with said trailing ring for delaying the return thereof from said cocked to said rest position; and manually operable means capable of being placed in a position for providing different types of operation one of which is a position which will provide a time exposure, said manually operable means when placed in said position for providing a time exposure cooperating with said electrical delay means for opening the circuit thereof so as to prevent operation of said electrical delay means when said manually operable means is set to provide a time exposure.

14. In a camera, in combination, shutter means including coaxial rotary leading and trailing rings turnable together from a rest position to a cocked position, said leading ring turning from said cocked to said rest position in advance of said trailing ring for opening said shutter means and said trailing ring then turning from said cocked to said rest position to close said shutter means, said leading ring having a projection; retarding means coacting with said leading ring for retarding the return movement thereof from said cocked toward said rest position; stop means situated in the path of movement of said projection; manually operable adjusting means operatively connected to said stop means for adjusting the location thereof, so as to determine by engagement of said projection with said stop means during return of said loading ring from said cocked toward said rest position the size of the aperture provided by said shutter means, and switch means also adjusted by said means for adjusting the location of said stop means, the adjustment of said switch means providing automatic closing of said switch means substantially simultaneously with engagement of said projection with said stop means during return of said leading ring from said cocked toward rest position, whereby said switch means may be used to close the circuit of a flash assembly.

15. In a camera, in combination, shutter means including coaxial rotary leading and trailing rings turnable together from a rest position to a cocked position, said leading ring turning from said cocked to said rest position in advance of said trailing ring for opening said shutter means and said trailing ring then turning from said cocked to said rest position to close said shutter means, said leading ring having a projection; retarding means coacting with said leading ring for retarding the return movement thereof from said cocked toward said rest position; stop means situated in the path of movement of said projection; manually operable adjusting means operatively connected to said stop means for adjusting the location thereof, so as to determine by engagement of said projection with said stop means during return of said leading ring from said cocked toward said rest position the size of the aperture provided by said shutter means, and switch means also adjusted by said means for adjusting the location of said stop means, the adjustment of said switch means providing automatic closing of said switch means substantially simultaneously with engagement of said projection with said stop means during return of said leading ring from said cocked toward said rest position, whereby said switch means may be used to close the circuit of a flash assembly; and switch-opening means carried by said trailing ring for engaging and opening said switch means when said trailing ring returns to its initial position with respect to said leading ring.

16. In a camera, in combination, shutter means including coaxial rotary leading and trailing rings turnable together from a rest position to a cocked position, said leading ring turning from said cocked to said rest position in advance of said trailing ring for opening said shutter means and said trailing ring then turning from said cocked to said rest position to close said shutter means, said leading ring having a projection; retarding means coacting with said leading ring for retarding the return movement thereof from said cocked toward said rest position; stop means situated in the path of movement of said projection; manually operable adjusting means operatively connected to said stop means for adjusting the location thereof, so as to determine by engagement of said projection with said stop means during return of said leading ring from said cocked toward said rest position the size of the aperture provided by said shutter means, and switch means also adjusted by said means for adjusting the location of said stop means, the adjustment of said switch means providing automatic closing of said switch means substantially simultaneously with engagement of said projection with said stop means during return of said leading ring from said cocked toward said rest position, whereby said switch means may be used to close the circuit of a flash assembly, said means for determining the position of said stop means including a turnable lever which carries said stop means and said switch means being carried by said lever and being in the form of a pair of elongated springy elements.

17. In a camera, in combination, shutter means including coaxial rotary leading and trailing rings turnable together from a rest position to a cocked position, said leading ring turning from said cocked to said rest position in advance of said trailing ring for opening said shutter means and said trailing ring then turning from said cocked to said rest position to close said shutter means, said leading ring having a projection; retarding means coacting with said leading ring for retarding the return movement thereof from said cocked toward said rest position; stop means situated in the path of movement of said projection; manually operable adjusting means operatively connected to said stop means for adjusting the location thereof, so as to determine by engagement of said projection with said stop means during return of said leading ring from said cocked toward said rest position the size of the aperture provided by said shutter means, and switch means also adjusted by said means for adjusting the location of said stop means, the adjustment of said switch means providing automatic closing of said switch means substantially simultaneously with engagement of said projection with said stop means during return of said leading ring from said cocked toward said rest position, whereby said switch means may be used to close the circuit of a flash assembly, said means for determining the position of said stop means including a turnable lever which carries said stop means and said switch means being carried by said lever and being in the form of a pair of elongated springy elements, said springy contact elements respectively engaging stationary terminals to which a flash assembly is adapted to be connected and said lever as well as said leading ring carrying limiting elements which also are adapted to be engaged by said springy contact elements.

18. In a camera, in combination, shutter means including coaxial rotary leading and trailing rings turnable together from a rest position to a cocked position, said leading ring turning from said cocked to said rest position in advance of said trailing ring for opening said shutter means and said trailing ring then turning from said cocked to said rest position to close said shutter means, said leading ring having a projection; retarding means coacting with said leading ring for retarding the return movement thereof from said cocked toward said rest position; stop means situated in the path of movement of said projection; manually operable adjusting means operatively connected to said stop means for adjusting the location thereof, so as to determine by engagement of said projection with said stop means during return of said leading ring from said cocked toward said rest position the size of the aperture provided by said shutter means, and switch means also adjusted by said means for adjusting the location of said stop means, the adjustment of said switch means providing automatic closing of said switch means substantially simultaneously with engagement of said projection with said stop means during return of said leading ring from said cocked toward said rest position, whereby said switch means may be used to close the circuit of a flash assembly; and control means carried by said rings and engaging said switch means for maintaining the latter open whenever said rings are in a position with respect to each other corresponding to the rest position of said rings.

19. In a camera, in combination, shutter means including coaxial rotary leading and trailing rings turnable together from a rest position to a cocked position, said leading ring turning from said cocked to said rest position in advance of said trailing ring for opening said shutter means and said trailing ring then turning from said cocked to said rest position to close said shutter means, said leading ring having a projection; retarding means coacting with said leading ring for retarding the return movement thereof from said cocked toward said rest position; stop means situated in the path of movement of said projection; manually operable adjusting means operatively connected to said stop means for adjusting the location thereof, so as to determine by engagement of said projection with said stop means during return of said leading ring from said cocked toward said rest position the size of the aperture provided by said shutter means, and switch means also adjusted by said means for adjusting the location of said stop means, the adjustment of said switch means providing automatic closing of said switch means substantially simultaneously with engagement of said projection with said stop means during return of said leading ring from said cocked toward said rest position, whereby said switch means may be used to close the circuit of a flash assembly; and electrical, light-responsive delay means operatively connected to said trailing ring for delaying the return thereof from said cocked to said rest position, said delay means delaying said trailing ring for a minimum period of time which is at least equal to the time required for movement of said leading ring from said cocked all the way back to said rest position thereof.

20. In a camera, in combination, shutter means including coaxial rotary leading and trailing rings turnable together from a rest position to a cocked position, said leading ring turning from said cocked to said rest position in advance of said trailing ring for opening said shutter means and said trailing ring then turning from said cocked to said rest position to close said sutter means, said leading ring having a projection; retarding means coacting with said leading ring for retarding the return movement thereof from said cocked toward said rest position; stop means situated in the path of movement of said projection; manually operable adjusting means operatively connected to said stop means for adjusting the location thereof, so as to determine by engagement of said projection with said stop means during return of said leading ring from said cocked toward said rest position the size of the aperture provided by said shutter means, and switch means also adjusted by said means for adjusting the location of said stop means, the adjustment of said switch means providing automatic closing of said switch means substantially simultaneously with engagement of said projection with said stop means during return of said leading ring from said cocked toward said rest position, whereby said switch means may be used to close the circuit of a flash assembly; second switch means for closing a flash circuit to be used with flash devices which have an ignition delay longer than flash devices adapted to be actuated by said first switch means; and means carried by said leading ring for closing said second switch means during the initial portion of the return of said leading switch means from said cocked to said rest position.

21. In a camera, in combination, shutter means including coaxial rotary leading and trailing rings turnable together from a rest position to a cocked position, said leading ring turning from said cocked to said rest position in advance of said trailing ring for opening said shutter means and said trailing ring then turning from said cocked to said rest position to close said shutter means, said leading ring having a projection; retarding means coacting with said leading ring for retarding the return movement thereof from said cocked toward said rest position; stop means situated in the path of movement of said projection; manually operable adjusting means operatively connected to said stop means for adjusting the location thereof, so as to determine by engagement of said projection with said stop means during return of said leading ring from said cocked toward said rest position the size of the aperture provided by said shutter means, and switch means also adjusted by said means for adjusting the location of said stop means, the adjustment of said switch means providing automatic closing of said switch means substantially simultaneously with engagement of said projection with said stop means during return of said leading ring from said cocked toward said rest position, whereby said switch means may be used to close the circuit of a flash assembly; second switch means for closing a flash circuit to be used with flash devices which have an ignition delay longer than flash devices adapted to be actuated by said first switch means; means carried by said leading ring for closing said second switch means during the initial portion of the return of said leading switch means from said cocked to said rest position; and means carried by said trailing ring and engaging said second switch means for opening the latter when said trailing ring returns from said cocked to said rest position thereof.

22. In a camera, in combination, shutter ring means and shutter blades operatively connected thereto, said ring means being turnable from a shutter closing initial condition in which said blades are closed to a shutter opening intermediate condition in which said blades are open and from such intermediate condition back into said initial condition; adjustable limiting means located in the path of movement of said ring means from said initial to said intermediate condition thereof to adjust the extent to which the latter can move toward said intermediate condition thereof, whereby the extent of opening of said blades may be adjusted; delay means operatively connected to said ring means for delaying movement thereof from said shutter opening into said shutter closing condition, whereby said limiting means and said delay means cooperate with said ring means to provide not only an adjustment of the exposure time but also an adjustment of the aperture; and retarding means operatively connected to said ring means for constantly retarding movement thereof from said initial to said intermediate condition.

23. In a camera, in combination, shutter means including coaxial rotary leading and trailing rings and shutter blades operatively connected thereto, said rings turning together from a rest to a cocked position and said leading ring turning in advance of said trailing ring from said cocked to said rest position to displace said blades to an open position, said trailing ring then following said leading ring from the cocked to the rest position in order to again close the blades; retarding means operatively connected to said leading ring for continuously retarding the movement thereof from said cocked to said rest position; and means operatively connected to said shutter means for use with the latter in connection with the making of exposure in artificial light, said means operatively connected to said shutter means for use therewith in connection with exposures in artificial light being operatively connected to said shutter means for setting the latter to make exposures with an exposure time which is suitable for artificial light.

24. In a camera, in combination, shutter means including coaxial rotary leading and trailing rings and shutter blades operatively connected with said rings, said rings turning together from a rest to a cocked position and said leading ring turning in advance of said trailing ring from said cocked to said rest position to displace said blades to an open position, said trailing ring then following said leading ring from the cocked to the rest position in order to again close the blades; retarding means operatively connected to said leading ring for continuously retarding the movement thereof from said cocked to said rest position; and means operatively connected to said shutter means for use with the latter in connection with the making of exposures in artificial light, said means which is connected to said shutter means for use in connection with exposures in artificial light having a switch for igniting a source of artificial light and actuated by said shutter means in response to start of movement of said leading ring from cocked to rest position.

25. In a photographic apparatus, in combination, leading setting means movable between a first position and a plurality of second positions; trailing setting means movable between a first position and a rest position; shutter blade means arranged to define a range of apertures each corresponding to a different second position of said leading means and operatively connected with said setting means, said leading means moving from its first position in advance of said trailing means to open said blade means and said trailing means closing said blade means in the rest position thereof; manually adjustable limiting means for selecting the second position of said eading means and the corresponding aperture; retarding means for continuously retarding the movement of said leading means from its first position to the second position selected by said limiting means; and electrical delay means for timing unobstructed movement of said trailing means from its first position to the rest position with a delay which at least equals the interval required by said leading means to move from its first position to the selected second position, including blocking means movable into and from retaining engagement with said trailing means, relay means energizable to move said blocking means relative to said trailing means, first regulating means including photosensitive means for effecting energization of said relay means for a period of time which is a function of scene brightness, second regulating means including at least one resistor means for effecting energization of said relay means for at least one predetermined period of time, and switchover means for selectively connecting one of said regulating means in circuit with said relay means.

26. A structure as defined in claim 25, wherein said blocking means comprises a pivotable pawl which constitutes the armature of said relay means.

27. A structure as defined in claim 25, wherein said switchover means is arranged to connect a selected one of said regulating means in parallel with said relay means.

28. A structure as defined in claim 25, wherein said delay means further comprises normally open operating switch means in circuit with said relay means and said leading means comprises control means for closing said switch means on movement of said leading means from the first position thereof.

29. In a camera, in combination, plural shutter ring means and shutter blades operatively connected thereto, said plural shutter ring means being turnable from a shutter closing initial condition in which said shutter blades are closed to a shutter opening intermediate condition in which said shutter blades are open and from such intermediate condition back into said initial condition; adjustable limiting means located in the path of movement of said plural shutter ring means from said initial to said intermediate condition thereof to adjust the extent to which the latter can move toward said intermediate condition whereby the extent of opening of said shutter blades may be adjusted; and delay means operatively connected to each of said plural shutter ring means for delaying movement thereof from said shutter opening into said shutter closing condition whereby said adjustable limiting means and said delay means cooperate with said plural shutter ring means to provide not only an adjustment of the exposure time but also an adjustment of the aperture.

30. In a camera, in combination, movable leading and trailing setting means and shutter blade means operatively connected thereto, said setting means moving together from a rest position to a cocked position while said shutter blade means remains closed and said leading setting means moving in advance of said trailing setting means from said cocked to said rest position to open said shutter blade means while said trailing setting means then moves from said cocked to said rest position to return said blade means to said closed position and terminate the exposure; adjustable limiting means located in the path of movement of said leading setting means to adjust the extent to which the latter can return toward said rest position thereof; delay means operatively connected to said trailing setting means for delaying the return thereof from said cocked toward said rest position until after said leading setting means has completed its return movement, whereby said adjustable limiting means and said delay means cooperate with said setting means to provide a selected aperture; and retarding means operatively connected to said leading setting means for constantly retarding the running down movement thereof.

31. In a camera, in combination, coaxial rotary leading and trailing shutter rings and shutter blades operatively connected thereto, said rings turning together from a rest position to a cocked position while said shutter blades remain closed and said leading ring turning in advance of said trailing ring from said cocked to said rest position thereof to open said shutter blades while said trailing ring then moves from said cocked to said rest position thereof to return said blades to said closed position and terminate the exposure; adjustable limiting means located in the path of return movement of said leading ring to adjust the extent to which the latter can return toward said rest position thereof; and delay means arranged to delay the return movement of said trailing ring from said cocked position toward said rest position thereof until after said leading ring has completed its return movement, whereby said limiting means and said delay means cooperate with said rings to provide a selected aperture independently of the duration of exposure.

References Cited

UNITED STATES PATENTS

| | | | |
|---|---|---|---|
| 2,890,640 | 6/1959 | Noack | 95—63 |
| 3,057,280 | 10/1962 | Weise et al. | 95—63 XR |
| 3,069,989 | 12/1962 | Kiper | 95—63 |
| 3,092,003 | 6/1963 | Kiper | 95—63 |
| 3,099,196 | 7/1963 | Neubert | 95—63 |
| 3,099,197 | 7/1963 | Kiper | 95—63 |
| 3,162,108 | 12/1964 | Knorr et al. | 95—11.5 |
| 3,165,996 | 1/1965 | Kiper et al. | 95—64 |

FOREIGN PATENTS

| | | |
|---|---|---|
| 225,523 | 1/1963 | Austria. |
| 1,268,796 | 6/1961 | France. |
| 1,331,707 | 5/1963 | France. |

NORTON ANSHER, Primary Examiner

J. F. PETERS, JR., Assistant Examiner

U.S. Cl. X.R.

95—53, 11.5, 63